United States Patent [19]
Filter et al.

[11] 3,863,682
[45] Feb. 4, 1975

[54] ELECTRICALLY OPERATED RACE FOR PRODUCING A TRAVELLING FIELD

[75] Inventors: Walther Filter, Langenhagen; Claus Filter, Rethem/Aller, both of Germany

[73] Assignees: Vereinigte Osterreichische Eisen-und Stahlwerke-Alpine Montan Aktiengesellschaft, Vienna, Austria; Etablissement Wanderfield & Co., Schaan, Liechtenstein

[22] Filed: July 16, 1973

[21] Appl. No.: 379,409

[30] Foreign Application Priority Data
July 27, 1972 Austria............................ 6455/72

[52] U.S. Cl................. 139/134, 139/188 R, 310/13
[51] Int. Cl............................................. D03d 49/44
[58] Field of Search..... 139/134, 134.5, 142, 188 R; 310/13

[56] References Cited
UNITED STATES PATENTS

| | | | |
|---|---|---|---|
| 1,985,254 | 12/1934 | Huse ............................... | 139/134 X |
| 2,203,568 | 6/1940 | Grondahl........................... | 139/134 |
| 2,870,349 | 1/1959 | Rosenberg et al. .............. | 139/134 X |
| 2,993,130 | 7/1961 | Laithwaite ......................... | 310/13 |
| 3,333,124 | 7/1967 | Francis et al. .................... | 310/13 |
| 3,335,300 | 8/1967 | Von Brimer ....................... | 310/13 |
| 3,770,995 | 11/1973 | Eastham et al. .................. | 310/13 |

*Primary Examiner*—James Kee Chi
*Attorney, Agent, or Firm*—Kurt Kelman

[57] ABSTRACT

The race is combined with a movable body adapted to be propelled along said race by a travelling field. A laminated iron core has a plurality of teeth, which define slots between them and are formed with tooth heads having slot-defining surfaces which define outer end portions of said slots. Exciting winding means are disposed in said slots and define a plurality of poles having a predetermined pole pitch and energizable to produce a magnetic flux emerging from said tooth heads, whereby said race has a plurality of pole pitch portions each of which corresponds to one pole pitch and is adapted to be temporarily uncovered and temporarily at least partly covered by said movable body as it is propelled along said race. Said tooth heads have such a height that said slot-defining surfaces of said tooth heads in any uncovered pole pitch portion pass substantially the entire magnetic flux produced in said uncovered pole pitch portion. The reluctance presented to the magnetic flux passing through said outer end portions of said slots in any uncovered pole pitch portion exceeds the reluctance presented to the magnetic flux passing through said movable body in any at least partly covered pole pitch portion.

6 Claims, 3 Drawing Figures

ELECTRICALLY OPERATED RACE FOR PRODUCING A TRAVELLING FIELD

This invention relates to an electrically operated, travelling electric field race for moving bodies, such as shuttles, which temporarily and cover parts of the race which consists of a laminated iron core formed with slots for receiving the exciting windings.

The known travelling field races of looms consist of laminated iron cores and have pole heads having a relatively small height of not more than a few millimeters, just as in electric motors, where the pole heads also have only such a small height. This has generally been found to be a disadvantage, particularly in looms, because when the race is uncovered, the magnetic flux passing from pole to pole emerges from the laminated iron core at the surface of the race and the magnetic circuit is closed through the air. The magnetic flux thus obtained results in a relatively large proportion of reactive current so that a relatively high capacitor expenditure is required. This fact has substantially been the cause for the failure of previous attempts to use travelling field races particularly in looms.

The above-mentioned disadvantages are avoided according to the invention by providing the pole heads width surfaces which define the outer end portions of the slots between the pole heads and which pass substantially the entire magnetic flux of the exciting winding associated with a race portion corresponding to a pole pitch when the race is uncovered, and the reluctance presented to the magnetic flux passing through the outer end portions of the slots between the pole heads of an uncovered race portion corresponding to a pole pitch exceeds the reluctance presented to the flux passing through the moving body on an entirely or partly covered race portion corresponding to a pole pitch.

Thus, the invention resides substantially in passing the magnetic flux associated with a race portion corresponding to a pole pitch through the pole heads if said race portion is uncovered. Because the reluctance of iron is much lower than the reluctance of air, the reluctance presented to the magnetic flux produced by the exciting winding associated with a race portion corresponding to one pole pitch is substantially due only to the air gaps between the pole heads if the flux is passed through the pole heads. If the flux density in the pole heads exceeded the saturation density, the magnetic flux would emerge from the pole heads and the magnetic circuit would be completed in the air outside the pole heads so that it would have to pass over a much longer distance through the air, which presents a much higher reluctance. To minimize the proportion of reactive current for the excitation, it is a feature of the invention to provide pole heads which are so large that they can pass the entire magnetic flux associated with a race portion corresponding to a pole pitch without a saturation of the pole heads. In this connection, the flux density in those pole head surfaces which define the air gaps will be critical so that the area of these surfaces will be of special significance. Because in accordance with the invention the magnetic flux is passed through the individual pole heads, the reluctance is reduced and with it the proportion of reactive current and the capacitor expenditure which is required so that a travelling field race can be economically operated.

The higher pole heads formed by the iron laminations also enable an increase of the width of the travelling field race so that the latter is considerably mechanically stiffened, as is desired. This is accomplished according to the invention with filling elements which protrude on both sides from the iron core and which are inserted in the outer end portions of the slots in known manner and a filler compound is placed in the free gaps between the protruding portions of the filling elements and together with the filling elements increases the width and mechanically stiffens the race. The higher pole heads enable the accommodation of the supporting means required for the increase in width. This was not possible before in the known races having low pole heads. The known filling elements which protrude from the iron core serve only to support the winding ends rather than to carry a filling compound placed between them so that they do not result in a mechanical stiffening of the iron core.

The filling compound between the filling elements consists suitably of a substance which can be cast and hardened. The use of such material facilitates the assembly and promotes the mechanical connection between the means used to increase the width of the race.

In a special embodiment of the invention, the filling compound covers the filling elements and forms the surface of the race. As a result, the race has a continuous, smooth sliding contact surface on the right and left of the laminations although the race is composed of individual elements. This promotes the movement of the moving body, particularly at high velocities.

Finally, in a preferred embodiment of the invention, the outer end portions of the slots are locally enlarged in width to receive conforming enlarged portions of the filling elements, as is known per se in connection with slot wedges. This design has the advantage that the enlarged portions of the filling elements take up the shear forces which are due to the normal electric force acting on the moving body. Besides, it is important that this arrangement is self-supporting so that there is no need for special lateral supports.

Two embodiments of the invention are shown by way of example on the accompanying drawings, in which FIG. 1 is a perspective view showing part of the travelling field race, partly without width-increasing means, partly with completed width-increasing means and partly with width-increasing means which have not yet been completed.

Figure 1:
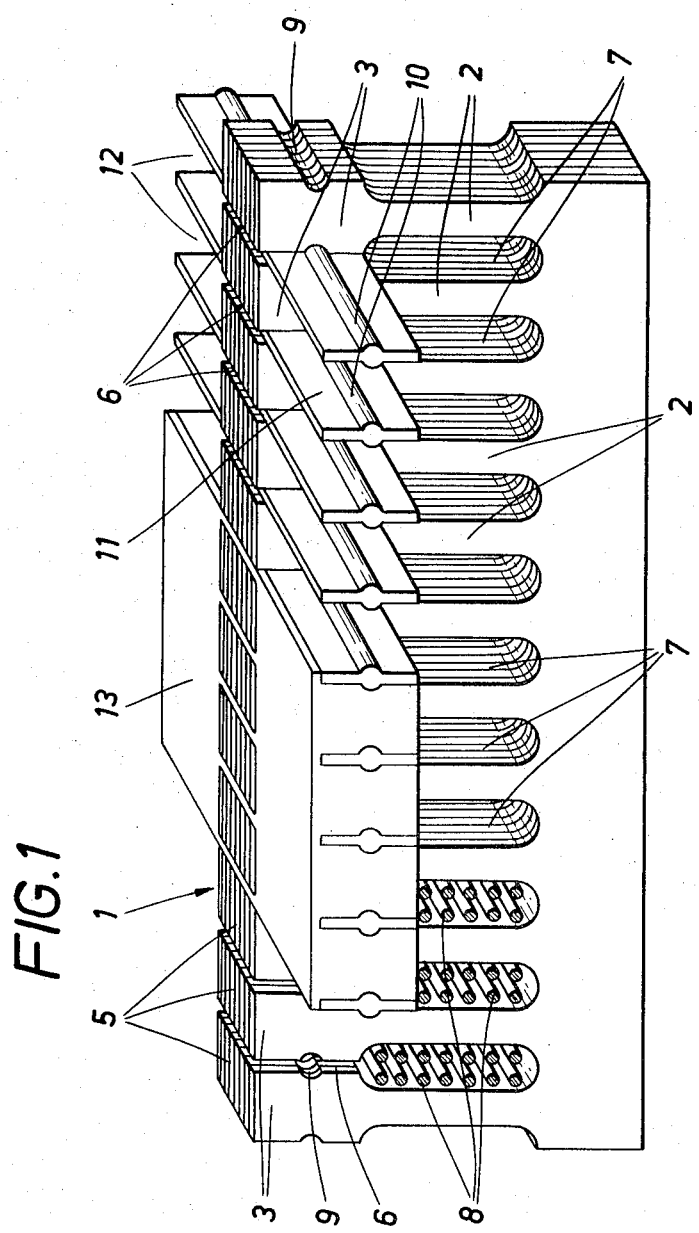

FIG. 1 shows a straight travelling field race 1, which in the conventional manner is composed of iron laminations having pole limbs 2 formed with pole heads 3. The height of the pole heads and the area of the surface thereof which defines the outer end portions of the slots therebetween are selected so that, in an uncovered travelling field race portion corresponding to one pole pitch, the magnetic flux passes in both directions in the iron core through the pole heads and across the outer end portions of the slots and the resistance presented to the flux as it passes across the air gaps between the pole heads exceeds the resistance presented to the magnetic flux when the race portion corresponding to a pole pitch is entirely or partly covered by the moving body and the magnetic flux passes entirely or partly through the moving body.

Figure 3:
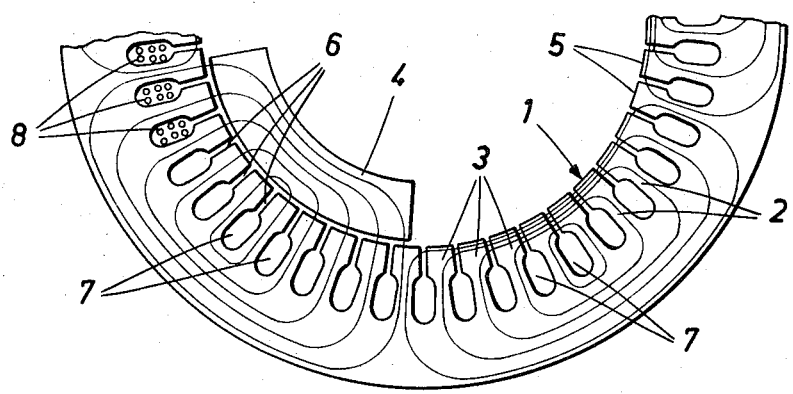
FIG. 3 is a diagram showing lines of magnetic flux for both embodiments.

FIG. 3 shows the instantaneous distribution of the magnetic flux emerging from two poles of a curved travelling field race. If the curved travelling field race is developed into a plane, the same situation will be obtained as in FIG. 1.

In the left-hand half of FIG. 3, the travelling field race is shown together with the instantaneous distribution of the magnetic flux adjacent to a pole when the latter is covered by the moving body 4. In this case the magnetic flux passes through the ferromagnetic portion of the moving body and causes the same to be propelled in the direction of travel of the travelling field.

In the right-hand half of FIG. 3 the travelling field race is shown together with the instantaneous distribution of the magnetic flux adjacent to a pole which is not covered by the moving body. In this case, the magnetic flux passes through the pole heads 3 which are increased in height, and from pole head to pole head passes through the intervening air gaps. The reluctance there presented to the magnetic flux exceeds the reluctance presented when the travelling field is covered by the moving body.

Where the pole heads are increased in height in accordance with the invention, the reluctance presented to the magnetic flux is however much lower than where low pole heads are used because the latter will become oversaturated so that the flux will emerge from the pole heads and must pass through the air adjacent to the race portion corresponding to a pole pitch. The ratio of the reluctance presented to the magnetic flux as it passes through the air to the reluctance presented by a ferromagnetic material in a path of comparable length is about 1000:1.

Whereas this unfavorable reluctance ratio cannot be entirely eliminated by the use of higher pole heads in a travelling electric field race which is temporarily and partly covered, experience has shown that the use of such higher pole heads reduces the electrical expenditure which was previously required for compensation in conjunction with a temporarily or partly covered travelling electric field race. This expenditure is reduced to such a degree that the use of travelling field races according to the invention becomes economical.

The travelling field race is formed by the pole heads 3. Laminations 5 define outer end portions 6 of slots 7 which accommodate the field-exciting winding 8, which is electrically insulated from the slot-defining wall.

The outer end portions 6 of the slots are increased in width on both sides by recesses 9 which together form a bearing for enlarged portions 10 of filling elements 11. By these enlarged portions 10 the filling elements 11 are reliably held in the outer end portions 6 of the slots. The filling elements 11 protrude on both sides of the travelling field raceway. The gaps 12 between the filling elements 11 are filled with a filling compound 13, which consists suitably of plastics material. The filling elements are somewhat recessed from the surface of the travelling field race. The entire surface of the recesses and of the air gaps between the laminations 5 is filled by the filling compound 13 as far as to the surface of the travelling field race so that a coherent, smooth surface is formed which serves as a sliding contact surface for the moving body.

Figure 2:
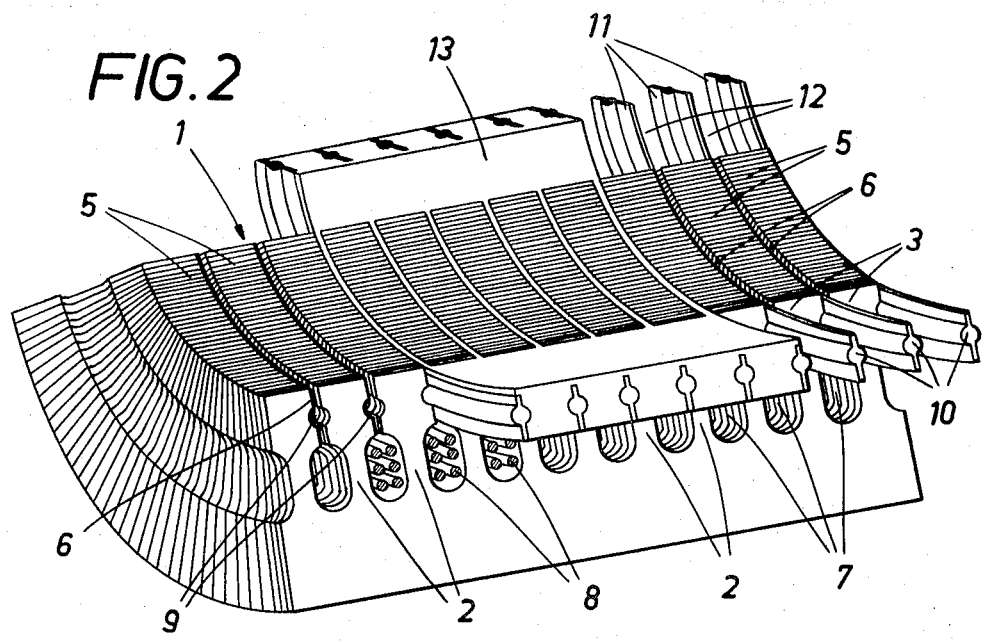
FIG. 2 is also a perspective view showing a curved race portion also partly without width-increasing means, partly with completed width-increasing means and partly with width-increasing means which have not yet been completed.

In the embodiment shown in FIG. 2, the technical situation is the same as in the embodiment of FIG. 1 with the single difference that the race 1 is curved rather than straight as in the embodiment shown in FIG. 1.

Whereas the travelling field race according to the invention is particularly suitable for shuttles, it is not restricted thereto but can be used to advantage wherever a body is moved along a race.

What is claimed is:

1. An electrically operated traveling field race for propelling a movable body along the race, the race comprising body propelling means consisting essentially of
   1. a laminated iron core having a plurality of pole limbs defining slots therebetween and formed with pole heads having slot defining surfaces which define outer end portions of the slots, and
   2. exciting electrically conductive winding means disposed in the slots and defining a plurality of poles each having a pole pitch and energizable to produce a magnetic flux emerging from the pole heads,
      a. whereby the race has a plurality of pole pitch portions each of which corresponds to one of the pole pitches and
      b. each pole pitch portion is adapted to be temporarily uncovered and at least partly covered by the movable body as it is propelled along the race,
      c. the pole heads having a height sufficient to enable the slot defining surfaces thereof to pass substantially the entire magnetic flux produced in any uncovered pole pitch portion between the outer end portions of the slots from pole head to pole head, and
      d. the reluctance presented to the magnetic flux passing through the outer end portions of the slots in any uncovered pole pitch portion exceeding the reluctance presented to the magnetic flux passing through the movable body in any at least partly covered pole pitch portion.

2. A race as set forth in claim 1, which constitutes a shuttle race of a loom.

3. A race as set forth in claim 1, which comprises filling elements inserted in said outer end portions of said slots and laterally protruding from said laminated iron core so as to define spaces between said filling elements, and
a filling compound disposed in said spaces,
said filling elements and filling compound increasing the width of said race and mechanically stiffening the same.

4. A race as set forth in claim 3, in which said filling compound consists of a substance which has been cast and hardened.

5. A race as set forth in claim 3, in which said filling compound covers said filling elements to form a surface of the race.

6. A race as set forth in claim 3, in which
said outer end portions of said slots are formed with recesses locally increasing the width of said outer end portions and
said filling elements are formed with enlarged portions conforming to and disposed in said recesses.

* * * * *